US010341082B1

(12) United States Patent
Balakrishnan et al.

(10) Patent No.: US 10,341,082 B1
(45) Date of Patent: Jul. 2, 2019

(54) DELAY MODULATED CLOCK DIVISION

(71) Applicant: TEXAS INSTRUMENTS INCORPORATED, Dallas, TX (US)

(72) Inventors: Jaiganesh Balakrishnan, Bangalore (IN); Shagun Dusad, Bangalore (IN); Visvesvaraya Pentakota, Bangalore (IN); Srinivas Kumar Reddy Naru, Markapur (IN); Sarma Sundareswara Gunturi, Bangalore (IN); Nagalinga Swamy Basayya Aremallapur, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/906,000

(22) Filed: Feb. 27, 2018

(51) Int. Cl.
*H04L 7/00* (2006.01)
*H03K 5/14* (2014.01)
*H03K 5/00* (2006.01)
*H04L 9/32* (2006.01)

(52) U.S. Cl.
CPC ............ *H04L 7/0037* (2013.01); *H03K 5/14* (2013.01); *H04L 7/0087* (2013.01); *H03K 2005/00019* (2013.01); *H04L 9/3247* (2013.01)

(58) Field of Classification Search
CPC . H04L 9/3247; H04L 2209/20; H04L 7/0087; G06F 1/10; H03L 7/0814; H03K 5/14
USPC .......................................................... 375/355
See application file for complete search history.

(56) References Cited

U.S. PATENT DOCUMENTS

| 6,609,221 | B1* | 8/2003 | Coyle .................. G06F 11/221 714/715 |
| 2002/0145926 | A1* | 10/2002 | Pochmuller ............. G11C 7/22 365/201 |
| 2013/0021075 | A1* | 1/2013 | Felix ........................ G06F 1/10 327/164 |
| 2015/0200679 | A1* | 7/2015 | Stein ....................... H04L 27/01 341/155 |

* cited by examiner

*Primary Examiner* — Leila Malek
(74) *Attorney, Agent, or Firm* — John R. Pessetto; Charles A. Brill; Frank D. Cimino

(57) ABSTRACT

A clock divider comprises a clock delay line that comprises a plurality of delay elements, a clock delay selector coupled to the clock delay line and configured to select one of the plurality of delay elements and a bit pattern source coupled to the clock delay selector. The clock delay line is configured to generate a modulated divided clock signal with a suppressed fundamental spectral component.

13 Claims, 3 Drawing Sheets

DELAY MODULATED CLOCK DIVISION

SUMMARY

According to aspects of the disclosure, a clock divider comprising a clock delay line comprising a plurality of delay elements, a clock delay selector coupled to the clock delay line and configured to select one of the plurality of delay elements, and a bit pattern source coupled to the clock delay selector. The clock delay line is configured to generate a modulated divided clock signal with a suppressed fundamental spectral component.

In other aspects of the disclosure, a radio frequency (RF) sampling receiver comprising a RF sampling analog-to-digital converter (ADC) configured to sample an RF signal at a sampling rate to form a sampled signal. The RF sampling receiver further comprises a clock generator coupled to the RF sampling ADC and configured to generate a root clock signal at the sampling rate for use by the RF sampling ADC in sampling the RF signal. The RF sampling receiver further comprises a clock divider configured to divide the root clock signal according to delay modulated clock division to form a modulated divided clock signal. The RF sampling receiver further comprises digital logic coupled to the RF sampling ADC and the clock divider and configured to process the sampled signal at a frequency of the modulated divided clock signal.

In other aspects of the disclosure, a method comprising generating a modulated divided clock signal with a rising edge delay of 0 for a first number of clock cycles, receiving a binary sequence, and determining whether a first bit of the binary sequence is a 1. The method further comprises generating the modulated divided clock signal with a rising edge delay of 0 for the first number of clock cycles when the first bit of the binary sequence is not a 1, generating the modulated divided clock signal by increasing the rising edge delay by an amount $\tau_{high}$ for each clock cycle with respect to a previous clock cycle such that the clock period is $8T-\tau_{high}$ for a second number of clock cycles when the first bit of the binary sequence is a 1, and generating the modulated divided clock signal with a rising edge delay of 4T for a third number of clock cycles subsequent to an end of the second number of clock cycles, wherein T is a period of a root clock on which the modulated divided clock signal is at least partially based. The method further comprises determining whether a second bit of the binary sequence is a 0, generating the modulated divided clock signal with a rising edge delay of 4T for the fourth number of clock cycles when the second bit of the binary sequence is not a 0, generating the modulated divided clock signal by decreasing the rising edge delay by an amount $\tau_{low}$ for each clock cycle with respect to another previous clock cycle such that the clock period is $8T-\tau_{low}$ for a fifth number of clock cycles when the second bit of the binary sequence is a 0, and generating the modulated divided clock signal with a rising edge delay of 0 for a sixth number of clock cycles subsequent to an end of the fifth number of clock cycles.

BRIEF DESCRIPTION OF THE DRAWINGS

For a detailed description of various examples, reference will now be made to the accompanying drawings in which.

DETAILED DESCRIPTION

Figure 1:
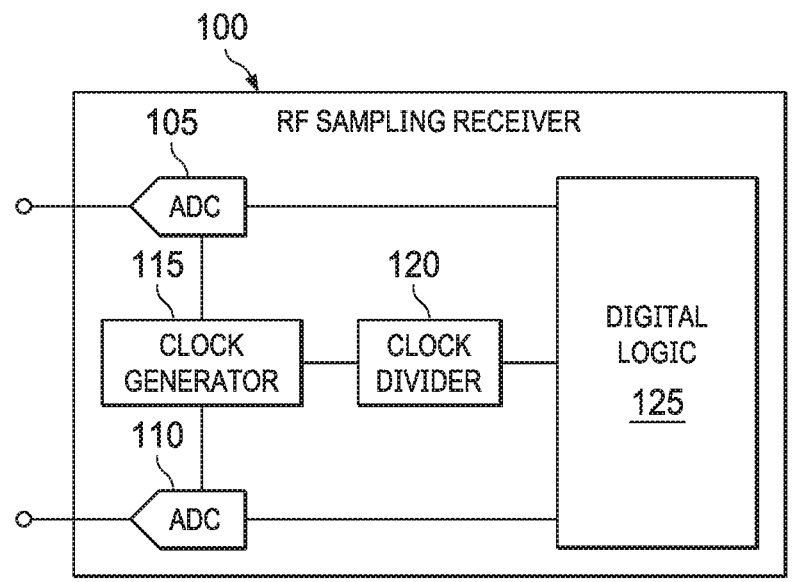
FIG. 1 shows a block diagram of an illustrative radio frequency (RF) sampling receiver.

In some examples, an RF sampling receiver is implemented (such as in a wireless base station receiver) to sample a received RF signal directly with a high-speed RF sampling analog-to-digital converter (ADC). The sampling is performed, for example, utilizing digital down-converters (DDC) and without utilizing mixers in the RF or analog domains, thereby facilitating simultaneous (or substantially simultaneous) multi-band reception of RF signals by the RF sampling receiver. In some examples, the RF sampling receiver has strict performance requirements, such as spurious-free dynamic range (SFDR) performance, spectral density performance, etc.

In at least one example, the RF sampling receiver includes both the RF sampling ADC as well as additional digital logic and/or modules that further process the RF signal after conversion to the digital domain by the RF sampling ADC. In some examples, a sampling rate (fs) of the RF sampling ADC is large (e.g., on an order of giga-samples per second) while the remaining digital logic operates at a slower rate such as, in one example, a frequency of fs/8 (which in some examples is derived by dividing another clock having a frequency of fs/4). Simply dividing a clock signal that is provided to the RF sampling ADC to sample the RF signal at fs to form a divided clock (e.g., the fs/8 clock), in some examples, results in clock mixing spurs in an output of the RF sampling ADC. For example, when the digital logic is clocked at a particular frequency (e.g., fs/8), the digital operations of that digital logic occur with a periodicity corresponding to a clock period of 8T, where T is a period of the clock signal that is provided to the RF sampling ADC. This periodic activity couples to the analog circuitry and, in some circumstances, disturbs the clock signal received by the RF sampling ADC. In various example, the disturbance includes spurious components at multiples of fs/8. If the digital logic is clocked at a higher frequency of fs/4 (having a periodicity of 4T, where T=1/fs), the spurious component at frequency fs/8 is not present. However, such a higher clocking of the digital logic would require the digital logic to be synthesized at twice the original clock frequency. This doubling of synthesis frequency, in at least some examples, increases a size (e.g., area) of the digital logic, increase power consumed by the digital logic, and/or prevent a timing closure of the digital logic resulting in the digital logic being non-realizable. In at least one example, when the digital logic toggles on a clock edge, the spurious component (e.g., a clock mixing spur) occurs in the analog domain. For example, for an RF signal having a frequency of fin, the digital logic toggles result in spurious frequency components at frequencies of fin±fs/8, fin±fs/4, fin±2fs/8, fin±3fs/8, fin±2fs/4, etc. in the RF signal. In at least one example, these spurious frequency components limit SFDR performance and/or adversely affect an output of the RF sampling ADC.

At least some aspects of the present disclosure provide for a delay modulation clock division to generate a divided digital clock. In at least one example, a delay modulated divided clock is generated to have an average frequency of fs/8. In at least one example, the modulation of the delay modulated clock signal modulates the clock signal delay between 0 and 4T for the delay modulated divided clock such that edges of the delay modulated clock signal align with both the odd and even edges of a fs/4 digital clock across time. In this way, the digital operations of that digital logic clocked by the delay modulated clock signal occur at both the odd and even edges of the fs/4 digital clock, thereby mitigating spurious components that occur at a frequency of fs/8. This alignment of clock edges is further illustrated and described below with respect to FIG. 3. The delay modulation clock division, in at least some examples, mitigates spurious frequency components (e.g., clock mixing spurs) resulting from digital logic operating at a divided clock rate, as discussed above. In at least one example, a clock divider circuit implements the delay modulation clock division. In various examples, the clock divider circuit is implemented in a receiver, an RF sampling receiver, or any other digital device that is susceptible to clock mixing spurs. In at least one example, the delay modulation clock division is performed (for a divided clock frequency of fs/8) to mitigate clock mixing spurs at fs/8 frequencies for frequencies lower than fs such that the clock mixing spurs only remain at fs/4 frequencies. While illustrated and discussed herein for the sake of simplicity and ease of understanding as mitigating spurious components at fs/8 frequencies, at least some aspects of the present disclosure are equally applicable to mitigating spurious components at other frequencies. For example, at least some aspects of the present disclosure provide for implementing a clock division factor of n to mitigate fs/n spurious components such that delay modulation according to the present disclosure spans a range of 0, T, 2T, . . . , (n−1)T.

Referring now to FIG. 1, a block diagram of an illustrative RF sampling receiver 100 is shown. In at least one example, the RF sampling receiver 100 includes a first RF sampling ADC 105, a second RF sampling ADC 110, a clock generator 115, a clock divider 120, and digital logic 125. In at least one example, the clock divider 120 implements delay modulation clock division as described in the present disclosure. In various examples, the digital logic 125 includes any one or more digital logic components or devices suitable for processing a RF signal converted into the digital domain, the scope of which is not limited herein. In at least one example, the digital logic 125 includes parallel paths coupled to each of the first RF sampling ADC 105 and the second RF sampling ADC 110. In at least one example, the parallel paths include (although not shown) any one or more of a digital down-conversion (DDC) mixer, a digital filter, a digital re-sampler, and/or a digital automatic gain control (AGC), and a scope of the digital logic and/or the parallel paths is not limited herein.

In at least one example, the first RF sampling ADC 105 and the second RF sampling ADC 110 operate at a first sampling rate and the digital logic 125 operates at a clock frequency less than fs (e.g., a divided clock). In at least one example, the clock generator 115 generates a first clock signal (CLK) at a frequency of fs and the clock divider 120 generates the divided clock based at least partially on CLK. In at least one example, the clock generator 115 further generates a partially divided clock based on CLK and the clock divider 120 generates the divided clock based at least partially on the partially divided clock. In at least one example, the first RF sampling ADC 105 and the second RF sampling ADC 110 are replaced and/or supplemented (e.g., combined) with a first RF sampling digital to analog converter (DAC) (not shown) and a second RF sampling DAC (not shown) such that the RF sampling receiver 100 is instead an RF sampling transmitter (not shown) and/or an RF sampling transceiver (not shown). The first RF sampling DAC and the second RF sampling DAC, in at least one example, convert a digital signal received from the digital logic 125 to a RF signal, at least partially according to the first sampling rate based on the first clock signal, for transmission.

Figure 2:
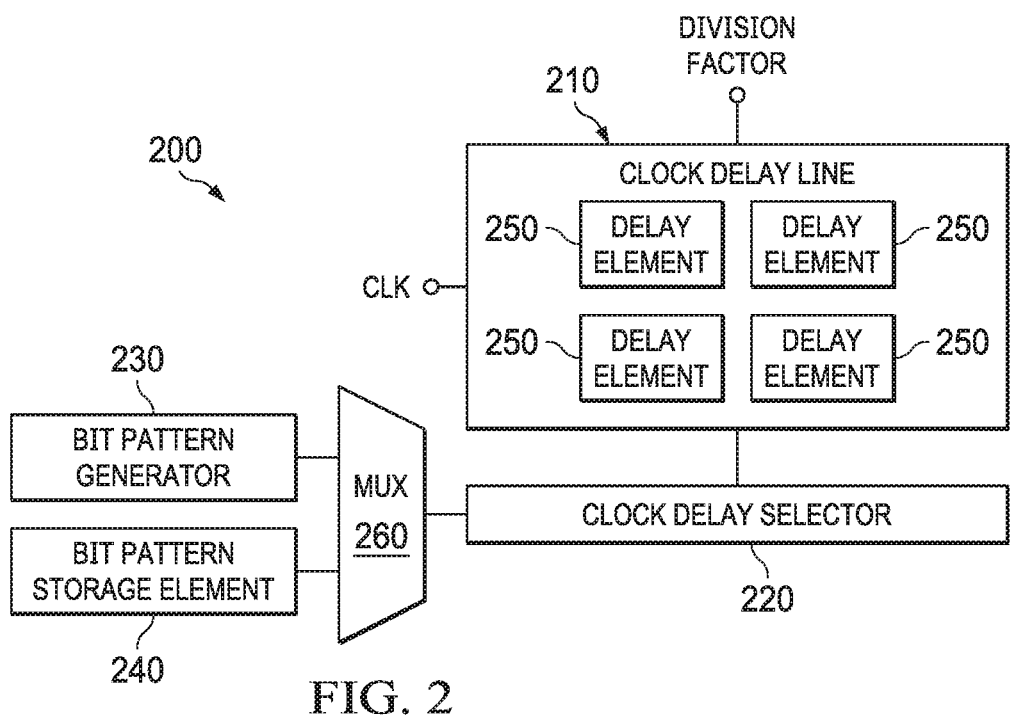
FIG. 2 shows a block diagram of an illustrative clock divider.

Referring now to FIG. 2, a block diagram of an illustrative clock divider 200 is shown. In at least one example, the clock divider 200 is suitable for implementation as the clock divider 120, as discussed above with respect to FIG. 2. In another example, the clock divider 200 is suitable for implementation in any device in which a root clock signal is generated and one or more other clock signals are generated at least partially based on the root clock signal (e.g., by dividing the root clock signal to form the one or more other clock signals, for example, at least partially based on the clock divider 200 and/or according to various aspects of the present disclosure).

In at least one example, the clock divider 200 includes a clock delay line 210 and a clock delay selector 220. In at least one example, the clock divider 200 further includes a bit pattern generator 230 (which in some examples is generally referred to as a bit pattern source). In another example, the clock divider 200 further includes a bit pattern storage element 240 (which in some examples is generally referred to as a bit pattern source). In yet another example, the clock divider 200 includes both the bit pattern generator 230 and the bit pattern storage element 240. In at least one example, the clock delay line 210 is configured to couple to a clock generator (or otherwise receive a clock signal that is to be divided by the clock divider 200). In at least one example, the clock delay line 210 is further configured to receive a clock division factor, for example, from a processing element (not shown) or another device external to the clock divider 200. In at least one example, the clock delay selector 220 is coupled to the clock delay line 210 and the bit pattern generator 230 and/or the bit pattern storage element 240 is coupled to the clock delay selector 220. In at least one example, the clock divider 200 further includes a multiplexer 260 coupled between the clock delay selector 220 and the bit pattern generator 230 and/or the bit pattern storage element 240. In at least one example, a select line (not shown) of the multiplexer 260 is coupled to and controlled by any suitable device, located within or external to the clock divider 200 to select an output of the bit pattern generator 230 or the bit pattern storage element 240 for input to the clock delay selector 220. In at least one example, the bit pattern storage element 240 is configured to store and/or output a pre-defined bit pattern for controlling the clock delay selector.

In at least one example, the clock delay line 210 includes one or more delay elements 250. In various examples, the delay elements 250 are any one or more components or devices suitable for implementing an electrical delay (e.g., to delay a signal), such as an inverter, a buffer (e.g., clock buffer), or any other suitable device or component capable of implementing a delay. Individually, or collectively, the delay elements 250, in at least one example, provide for a delay range of 0 to 4T, where T=1/fs. In at least one example, an amount of delay provided by the respective delay elements 250 increases from a first delay element 250 to a second delay element 250 in a step of τ, where, in one example, τ=T/10. In other examples, τ is any suitable value determined at least partially according to a desired resolution of the delay elements 250. In at least one example, the clock delay selector 220 includes logic configured to control selection of a delay element 250 of the clock delay line 210, for example, to control an amount of delay implemented by the clock delay line 210. In at least one example, the clock delay selector 220 includes digital logic configured to implement state machine or other decision based computing to control the amount of delay implemented by the clock delay line 210.

In operation, the clock divider 200 is configured to, in at least one example, divide a clock signal received by the clock delay line 210 by the clock division factor received by the clock delay line 210 at a delay selected by the clock delay selector 220. For example, the clock divider 200 divides the clock signal by selecting one rising edge out of n consecutive rising edges (where n is the clock division factor) to generate the divided clock signal. In at least one example, after a rising edge of the input clock is selected, a falling edge is selected for the divided clock signal prior to selecting the next rising edge (e.g., after n CLKs). In at least one example, the clock delay line 210 generates multiple delayed versions of the clock signal (e.g., generates multiple delayed versions of the clock signal), each with a delay that is a multiple of τ. In this way, at least some examples of the clock delay selector 220 determine which delayed version of the clock signal generated by the clock delay line 210 (e.g., via at least some of the delay elements 250) is used to select the rising edge of the clock signal for the delayed clock signal and the clock division factor determines the number of rising edges in the clock signal after which the next rising edge occurs in the divided clock signal.

In some examples, delaying the divided clock signal suppresses and/or mitigates at least some clock mixing spurs of the divided clock, for example, such that a divided clock generated with a division factor of 8 has spurious components at fs/4 frequencies but not at fs/8 frequencies less than fs. A delay of the divided clock signal is modulated, in at least one example, between 0 and 4T while, for example, preventing a frequency of the divided clock from exceeding a threshold to minimize an increase in complexity of the digital logic that might increase an area of the digital logic and/or an amount of power consumed by the digital logic, as described above. The threshold is, for example, $1/(8T-\tau_{low})$ when the division factor is 8. In at least one example, $\tau_{low}$ is a predetermined value determined according to a desired complexity of the digital logic and maximum instantaneous frequency of operation of the digital logic. For example, a $\tau_{low}$ having a low value provides for an increased time (e.g., number of clock cycles) to transition from a delay of 0 to a delay of 4T, thereby reducing the level of mitigation of spurious frequency components according to the present disclosure, but is capable of implementation with low digital logic complexity (e.g., digital logic area and/or power consumption). As another example, a $\tau_{low}$ having a high value provides for a decreased time to transition from a delay of 0 to a delay of 4T, thereby increasing the level of mitigation of spurious frequency components according to the present disclosure and also increasing the digital logic complexity. During a decreasing transition in delay in the generated clock (e.g., from 4T to 0), a period of the divided clock generated by the clock divider 200 is less than, for example, 8T. During an increasing transition in delay in the generated clock (e.g., from 0 to 4T), a period of the divided clock generated by the clock divider is greater than, for example, 8T. In at least one example, after the decreasing transition has completed (e.g., the delay has reached 0) and/or the increased transition has completed (e.g., the delay has reached 4T), a period of the divided clock generated by the clock divider is 8T. In a generalized form, in at least some examples the clock divider 200 modulated the delay of the divided clock between 0 and NT/2.

Figure 3:
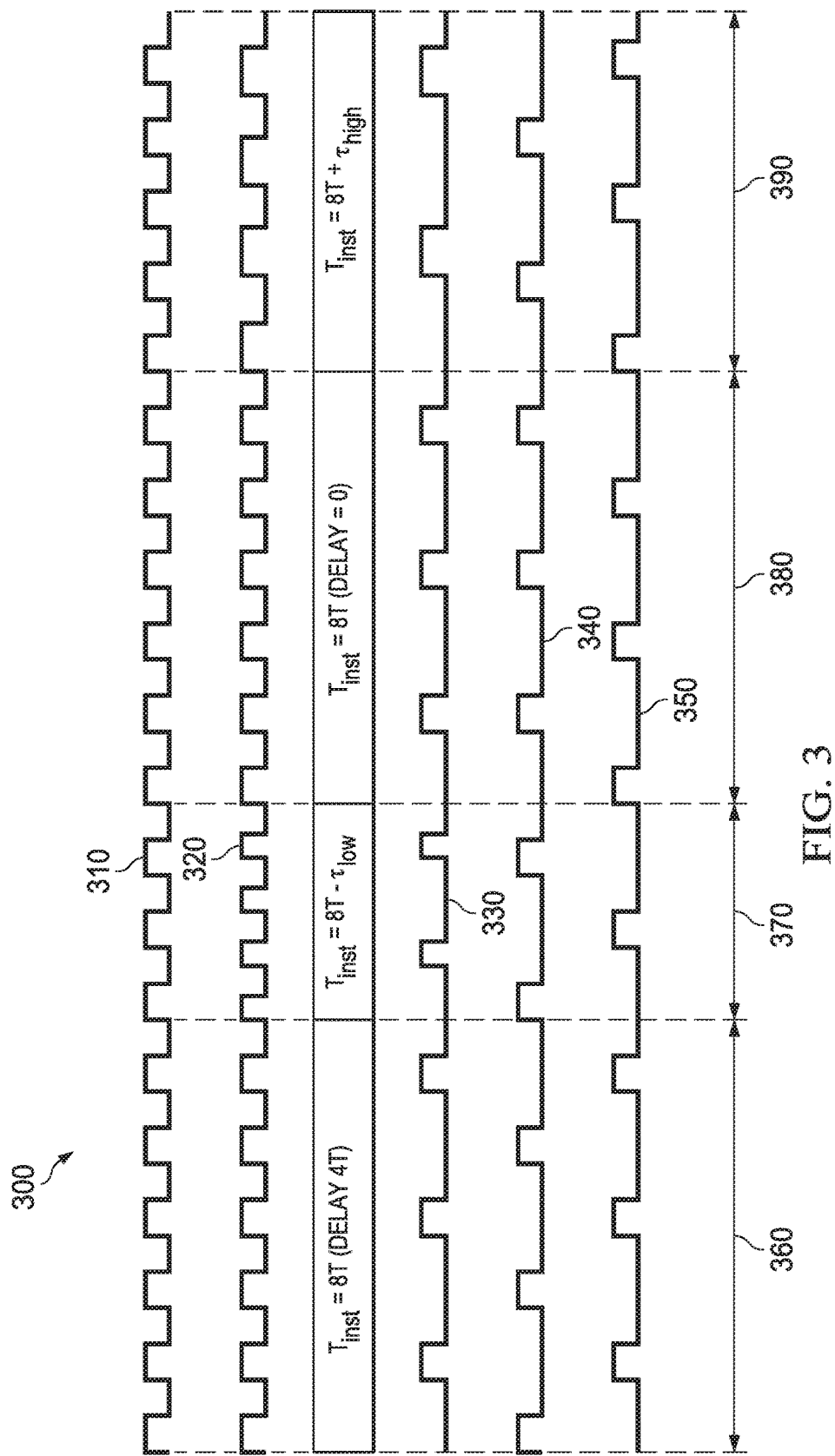
FIG. 3 shows an illustrative waveform of clock signals in a clock divider.

Referring now to FIG. 3, an illustrative waveform 300 of clock signals in a clock divider is shown. In at least one example, the clock signals are representative of clock signals received by and/or generated by the clock divider 200 of FIG. 2 and/or the clock divider 120 of FIG. 1. The waveform 300 illustrates a partially divided clock signal 310, a modulated partially divided clock signal 320, a modulated divided clock signal 330, a first phase of the divided clock signal 340, and a second phase of the divided clock signal 350. The waveform 300 illustrates four sections of the clock signals. In at least one example, during a first section 360, a period of the modulated divided clock signal 330 is 8T with a modulated delay of 4T. During a second section 370, for example, a transition period from a delay of 4T to a delay of 0, a period of the modulated divided clock signal 330 is $8T-\tau_{low}$. During a third section 380, a period of the modulated divided clock signal 330 is once again 8T with a modulated delay of 0. During a fourth section 390, for example, a transition period from a delay of 0 to a delay of 4T, a period of the modulated divided clock signal 330 is $8T+\tau_{high}$. In at least one example, $\tau_{high}$ is a programmable value (e.g., programmable at a time of manufacture and/or at a time of implementation by a user). In various examples, $\tau_{high}$ is selected to determine a number of clock cycles elapsed to transition from a delay of 0 to a delay of 4T. In at least one example, a value of $\tau_{high}$ is independent of considerations of complexity of the digital logic (e.g., in contrast to $\tau_{low}$, as discussed above) such that a variation in the value of $\tau_{high}$ improves mitigation of spurious frequency components without corresponding design trade-offs. Each of the first section 360, second section 370, third section 380, and fourth section 390 are, for example, consecutively aligned amounts of time.

As illustrated in FIG. 3, during the first section 360, rising clock edges of the modulated divided clock signal 330 are aligned with rising clock edges of the first phase of the divided (but unmodulated) clock signal 340. During the second section 370, the period of the modulated divided clock signal 330 decreases with respect to the period of the modulated divided clock signal 330 during the first section 360. During the third section 380, rising clock edges of the modulated divided clock signal 330 are aligned with rising clock edges of the second phase of the divided (but unmodulated) clock signal 350. During the fourth section 390, the period of the modulated divided clock signal 330 increases with respect to the period of the modulated divided clock signal 330 during the first section 360 and the third section 380. In at least one example, while the period (e.g., instantaneous period) of the modulated divided clock signal 330 varies by section, an average period of the modulated divided clock signal 330 remains the same. In at least one example, the modulated divided clock signal 330 as illustrated in FIG. 3 includes spurious components at fs/4 frequencies without including spurious components at fs/8 frequencies, at least partially according to the present disclosure as discussed above.

Figure 4:
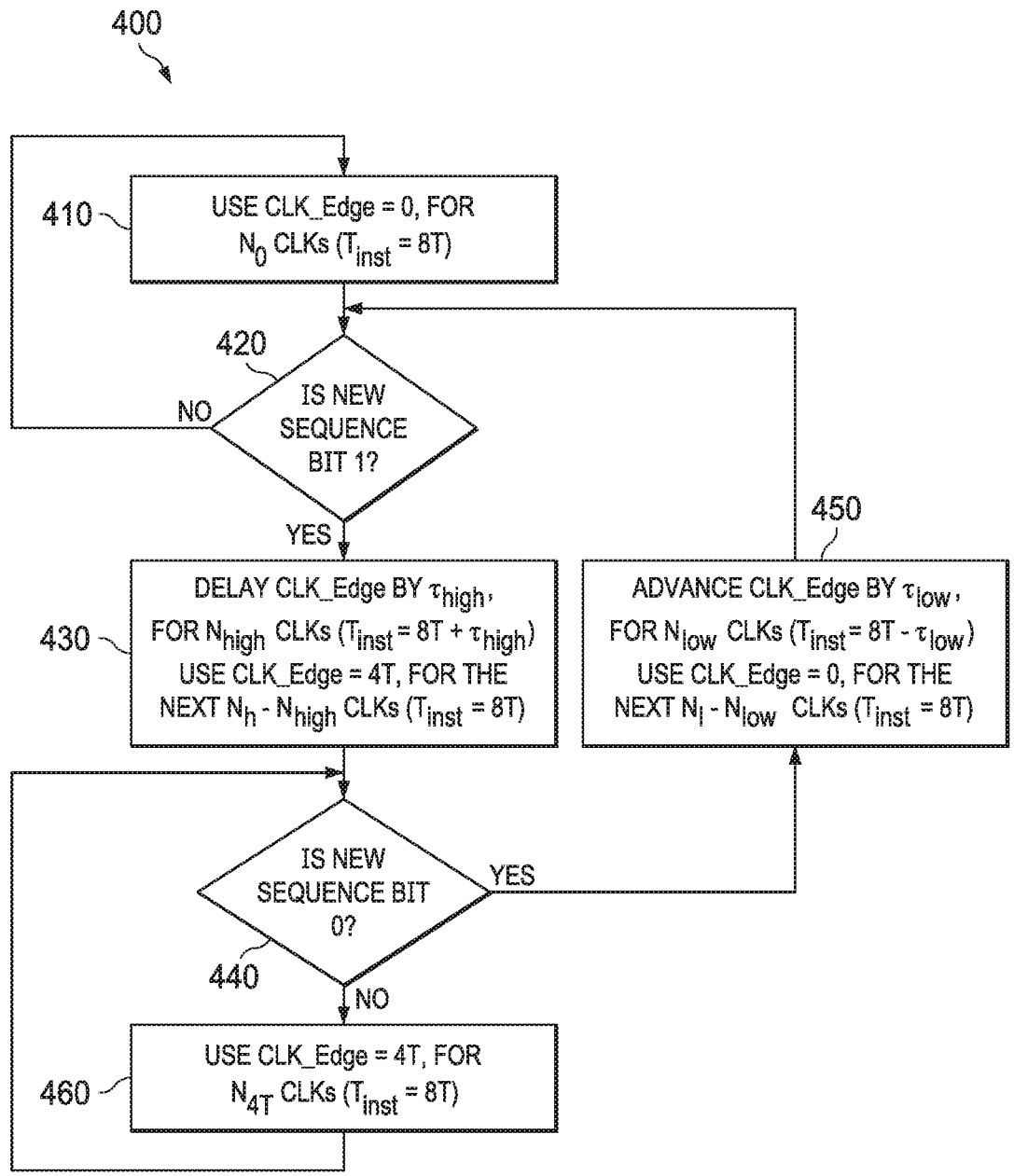
FIG. 4 shows a flowchart of an illustrative method of delay modulated clock division.

Referring now to FIG. 4, a flowchart of an illustrative method 400 of delay modulated clock division is shown. At least some aspects of the method 400 are implemented, for example, by a clock divider, such as the clock divider 200 of FIG. 2, for example, in the RF sampling receiver 100 of FIG. 1. The method 400 is implemented, for example, to generate a modulated divided clock signal by delay modulated clock division such that at least a portion of spurious components (e.g., at fundamental spectral frequencies) of the modulated divided clock signal are suppressed, at least partially according to the present disclosure as discussed above. In at least some examples, the modulated divided clock signal is at least partially based on a root clock signal. In at least some examples, the root clock signal has a frequency greater than a frequency of the modulated clock signal.

At operation 410, the method 400 begins with a rising clock edge of the modulated divided clock signal having a delay (and/or advance) of 0 for a pre-defined number (e.g., $N_0$) of clock cycles (e.g., rising edges). $N_0$ is, in at least one example, a programmable value (e.g., programmable at a time of manufacture and/or at a time of implementation by a user) selected to maximize an amount of mitigation of spurious frequency components according to aspects of the present disclosure. During the operation 410, in at least one example, an instantaneous period of the modulated divided clock signal is 8T (e.g., for an fs/8 modulated divided clock signal).

At operation 420, a bit pattern (e.g., binary sequence) is received and a determination of whether a new bit of the bit pattern is a "1" is made. In at least one example, the bit pattern is a pre-configured and stored bit pattern, for example, as discussed above. In another example, the bit pattern is a newly-generated bit pattern. When the new bit of the bit pattern is not "1," the method 400 returns to operation 410. When the new bit of the bit pattern is "1," the method 400 proceeds to operation 430.

At operation 430, the rising edge of the modulated divided clock signal is delayed by a time $\tau_{high}$ (e.g., with respect to the previous rising edge of the modulated divided clock signal) for $N_{high}$ cycles of the modulated divided clock signal (e.g., $N_{high}$ rising edges of the modulated divided clock signal). $N_{high}$ is selected, for example, such that a cumulative delay of 4T is achieved during the transition time of $N_{high}$ modulated divided clock signals when the instantaneous clock period is increased from 8T to 8T+$\tau_{high}$. In at least one example, when each rising edge of the modulated divided clock signal is delayed by $\tau_{high}$ (e.g., with respect to the previous rising edge of the modulated divided clock signal), an instantaneous period of the modulated divided clock signal is 8T+$\tau_{high}$. Following the $N_{high}$ cycles, in at least one example, the rising edge of the modulated divided clock signal is delayed by a time 4T for $N_h$-$N_{high}$ cycles of the modulated divided clock signal (e.g., $N_h$-$N_{high}$ rising edges of the modulated divided clock signal). In at least some examples, $N_h$=$N_{high}$. In another example, $N_h$ is a programmable value (e.g., programmable at a time of manufacture and/or at a time of implementation by a user) other than $N_{high}$ that is programmable to vary (e.g., maximize) an amount of mitigation of spurious components of the modulated divided clock signal, at least partially according to the present disclosure as discussed above. In at least one example, when the rising edge of the modulated divided clock signal is delayed by a time 4T, an instantaneous period of the modulated divided clock signal is 8T.

At operation 440, a determination of whether a new bit of the bit pattern is a "0" is made. When the new bit of the bit pattern is "0," the method 400 proceeds to operation 450.

At operation 450, the rising edge of the modulated divided clock signal is advanced by a time $\tau_{low}$, with respect to the previous rising edge of the modulated divided clock signal, for $N_{low}$ cycles of the modulated divided clock signal (e.g., $N_{low}$ rising edges of the modulated divided clock signal). $N_{low}$ is selected, for example, such that a cumulative delay of -4T is achieved during the transition time of $N_{low}$ modulated divided clock signals when the instantaneous clock period is increased from 8T to 8T-$\tau_{low}$. In at least one example, when the rising edge of the modulated divided clock signal is advanced by $\tau_{low}$, an instantaneous period of the modulated divided clock signal is 8T-$\tau_{low}$. Following the $N_{low}$ cycles, in at least one example, the rising edge of the modulated divided clock signal is returned to having a delay (and/or advance) of 0 for $N_l$-$N_{low}$ cycles of the modulated divided clock signal (e.g., $N_l$-$N_{low}$ rising edges of the modulated divided clock signal). In at least some examples, $N_l$=$N_{low}$. In another example, $N_l$ is a programmable value (e.g., programmable at a time of manufacture and/or at a time of implementation by a user) other than $N_{low}$ that is programmable to vary (e.g., maximize) an amount of mitigation of spurious components of the modulated divided clock signal, at least partially according to the present disclosure as discussed above. In at least one example, when the rising edge of the modulated divided clock signal is delayed by 0, an instantaneous period of the modulated divided clock signal is 8T. Following the $N_l$-$N_{low}$ cycles, in at least one example the method 400 returns to operations 420.

Returning now to operation 440, when the new bit of the bit pattern is not "0," the method 400 proceeds to operation 460. At operation 460, the rising edge of the modulated divided clock signal is delayed by a time 4T for $N_{4T}$ cycles of the modulated divided clock signal (e.g., $N_{4T}$ rising edges of the modulated divided clock signal). In at least some examples, $N_{4T}$ is a programmable value (e.g., programmable at a time of manufacture and/or at a time of implementation by a user) that is programmable to vary (e.g., maximize) an amount of mitigation of spurious components of the modulated divided clock signal, at least partially according to the present disclosure as discussed above. In at least one example, when the rising edge of the modulated divided clock signal is delayed by a time 4T, an instantaneous period of the modulated divided clock signal is 8T. In at least some examples, throughout the method 400 an average clock frequency of the modulated divided clock signal is approximately 1 (nT). Following the $N_{4T}$ cycles, in at least one example the method 400 returns to operations 440.

While the operations of the method 400 have been discussed and labeled with numerical reference, in various examples the method 400 includes additional operations that are not recited herein, any one or more of the operations recited herein include one or more sub-operations, any one or more of the operations recited herein are omitted, and/or any one or more of the operations recited herein are performed in an order other than that presented herein (e.g., in a reverse order, substantially simultaneously, overlapping, etc.), all of which is intended to fall within the scope of the present disclosure.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection is coupled through a direct connection or through an indirect connection via other devices and connections. Similarly, a device that is coupled between a first component or location and a second component or location is coupled through a direct connection or through an indirect connection via other devices and connections. A device that is "configured to" perform a task or function is configured (e.g., programmed) at a time of manufacturing by a manufacturer to perform the function and/or configurable (or re-configurable) by a user after manufacturing to perform the function and/or other additional or alternative functions. The configuring is through firmware and/or software programming of the device, through a construction and/or layout of hardware components and interconnections of the device, or a combination thereof. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A clock divider, comprising:
    a clock delay line comprising a plurality of delay elements;
    a clock delay selector coupled to the clock delay line and configured to select one of the plurality of delay elements; and
    a bit pattern source coupled to the clock delay selector,
    wherein the clock delay line is configured to generate a modulated divided clock signal with a suppressed fundamental spectral component;
    wherein the clock delay line is configured to:
    receive a division factor and a clock signal;
    receive a delay element selection signal from the clock delay selector; and
    modulate the clock signal according to the clock delay selector to form the modulated divided clock signal with the suppressed fundamental spectral component;
    wherein a delay of the clock signal is modulated between 0 and nT/2 to form the modulated divided clock signal, wherein T is a period of the clock signal, and n is a clock division factor of the clock delay line and is equal to a non-zero positive integer.

2. The clock divider of claim 1, wherein the clock delay line is further configured to divide the clock signal based at least partially on the division factor to form a divided clock signal.

3. A clock divider, comprising:
    a clock delay line comprising a plurality of delay elements;
    a clock delay selector coupled to the clock delay line and configured to select one of the plurality of delay elements; and
    a bit pattern source coupled to the clock delay selector,
    wherein the clock delay line is configured to generate a modulated divided clock signal with a suppressed fundamental spectral component;
    wherein the clock delay line is configured to:
    receive a division factor and a clock signal;
    receive a delay element selection signal from the clock delay selector; and
    modulate the clock signal according to the clock delay selector to form the modulated divided clock signal with the suppressed fundamental spectral component;
    wherein the clock delay line is further configured to form the modulated divided clock signal by delaying or advancing a rising edge of the clock signal by an amount between 0 and 4T in multiple incremental steps, wherein T is a period of the clock signal, and wherein a maximum instantaneous clock frequency of the modulated divided clock signal is limited by the multiple incremental steps.

4. A radio frequency (RF) sampling receiver, comprising:
    a RF sampling analog-to-digital converter (ADC) configured to sample an RF signal at a sampling rate to form a sampled signal;
    a clock generator coupled to the RF sampling ADC and configured to generate a root clock signal at the sampling rate for use by the RF sampling ADC in sampling the RF signal;
    a clock divider configured to divide the root clock signal according to delay modulated clock division to form a modulated divided clock signal; and
    digital logic coupled to the RF sampling ADC and the clock divider and configured to process the sampled signal at a frequency of the modulated divided clock signal;
    wherein the clock divider comprises:
    a clock delay line comprising a plurality of delay elements;
    a clock delay selector coupled to the clock delay line and configured to select one of the plurality of delay elements; and
    a bit pattern source coupled to the clock delay selector,
    wherein the clock delay line is configured to generate the modulated divided clock signal according to the delay modulated clock division.

5. The RF sampling receiver of claim 4, wherein the clock delay line is configured to:
    receive a division factor and the root clock signal;
    receive a delay element selection signal from the clock delay selector; and
    modulate the root clock signal according to the clock delay selector to form the modulated divided clock signal.

6. The RF sampling receiver of claim 5, wherein the clock delay line is further configured to form the modulated divided clock signal by delaying or advancing a rising edge of the root clock signal an amount between 0 and 4T in multiple incremental steps, wherein T is a period of the root clock signal, and wherein a maximum instantaneous clock frequency of the modulated divided clock signal is limited by the multiple incremental steps.

7. The RF sampling receiver of claim 5, wherein the clock delay selector generates the delay element selection signal according to one or more bits of a binary sequence received from the bit pattern source.

8. The RF sampling receiver of claim 4, wherein the delay modulated clock division modulates a delay of the root clock signal between 0 and 4T to form the modulated divided clock signal to suppress a fundamental spectral component of the modulated divided clock signal, wherein T is a period of the root clock signal.

9. A method, comprising:
    generating a modulated divided clock signal with a rising edge delay of 0 for a first number of clock cycles;
    receiving a binary sequence;
    determining whether a first bit of the binary sequence is a 1;
    generating the modulated divided clock signal with a rising edge delay of 0 for the first number of clock cycles when the first bit of the binary sequence is not a 1;
    generating the modulated divided clock signal by increasing the rising edge delay by an amount $\tau_{high}$ for each clock cycle with respect to a previous clock cycle such that a clock period is $8T-\tau_{high}$ for a second number of clock cycles when the first bit of the binary sequence is a 1;

generating the modulated divided clock signal with a rising edge delay of 4T for a third number of clock cycles subsequent to an end of the second number of clock cycles, wherein T is a period of a root clock signal on which the modulated divided clock signal is at least partially based;

determining whether a second bit of the binary sequence is a 0;

generating the modulated divided clock signal with a rising edge delay of 4T for a fourth number of clock cycles when the second bit of the binary sequence is not a 0;

generating the modulated divided clock signal by decreasing the rising edge delay by an amount $\tau_{low}$ for each clock cycle with respect to another previous clock cycle such that the clock period is $8T-\tau_{low}$ for a fifth number of clock cycles when the second bit of the binary sequence is a 0; and generating the modulated divided clock signal with a rising edge delay of 0 for a sixth number of clock cycles subsequent to an end of the fifth number of clock cycles.

10. The method of claim 9, wherein an instantaneous clock frequency of the modulated divided clock signal varies with the rising edge delay of the modulated divided clock signal.

11. The method of claim 9, wherein an average clock frequency of the modulated divided clock signal is 1/(nT), where n is a clock division factor and is equal to a non-zero positive integer.

12. The method of claim 9, wherein spurious components of the modulated divided clock signal at fundamental spectral frequencies of the modulated divided clock signal are suppressed.

13. The method of claim 9, wherein the modulated divided clock signal is at least partially based on the root clock signal having a frequency greater than the modulated divided clock signal.

* * * * *